(12) United States Patent
Kanda

(10) Patent No.: US 9,283,851 B2
(45) Date of Patent: Mar. 15, 2016

(54) DRIVE CONTROL DEVICE FOR MOTOR VEHICLE DURING LOW TEMPERATURE

(71) Applicant: NTN CORPORATION, Osaka (JP)

(72) Inventor: Takeshi Kanda, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/703,194

(22) Filed: May 4, 2015

(65) Prior Publication Data

US 2015/0231970 A1    Aug. 20, 2015

Related U.S. Application Data

(63) Continuation of application No. PCT/JP2013/079195, filed on Oct. 29, 2013.

(30) Foreign Application Priority Data

Nov. 8, 2012  (JP) .................. 2012-246140

(51) Int. Cl.
*B60L 9/00*   (2006.01)
*B60L 3/00*   (2006.01)
*B60L 15/20*  (2006.01)

(52) U.S. Cl.
CPC ............... *B60L 3/0061* (2013.01); *B60L 15/20* (2013.01)

(58) Field of Classification Search
USPC .......................................................... 701/22
See application file for complete search history.

(56) References Cited

U.S. PATENT DOCUMENTS

| 8,604,738 | B2 | 12/2013 | Takizawa | |
|---|---|---|---|---|
| 2006/0223673 | A1* | 10/2006 | Centlivre | B60W 10/06 477/181 |
| 2008/0318728 | A1* | 12/2008 | Soliman | B60K 6/445 477/4 |
| 2009/0258756 | A1* | 10/2009 | Long | F16H 61/0206 477/131 |
| 2010/0121542 | A1* | 5/2010 | Tsukamoto | F16H 61/20 701/51 |
| 2011/0095717 | A1 | 4/2011 | Takizawa | |
| 2011/0130237 | A1* | 6/2011 | Long | F16H 61/0206 475/127 |

FOREIGN PATENT DOCUMENTS

| JP | 2002-174328 | 6/2002 |
|---|---|---|
| JP | 2003-339101 | 11/2003 |
| JP | 2005-348535 | 12/2005 |
| JP | 2008-114818 | 5/2008 |
| JP | 2011-089625 | 5/2011 |
| JP | 2011-125121 | 6/2011 |

OTHER PUBLICATIONS

English translation of Japanese Publication JP-2011-125121.*
PCT International Preliminary Report on Patentability dated May 21, 2015 in corresponding International Patent Application No. PCT/JP2013/079195.
International search report mailed Nov. 26, 2013 in corresponding international application PCT/JP2013/079195.

* cited by examiner

*Primary Examiner* — Hussein A. Elchanti

(57) ABSTRACT

A low temperature drive control device is used for a motor mounted automotive vehicle in which the rotation of a motor is transmitted to a wheel and a common oil is used for cooling the motor and also for lubricating gears. The motor mounted automotive vehicle includes a command torque calculator for calculating a command torque to be applied to the motor in dependence on an acceleration input, a motor drive controller for controlling an electric current value to be supplied to the motor in dependence on the command torque calculated by the command torque calculator an oil temperature detector for detecting the oil temperature, and a motor torque changer for changing the command torque in dependence on the oil temperature detected by the oil temperature detector.

7 Claims, 10 Drawing Sheets

DRIVE CONTROL DEVICE FOR MOTOR VEHICLE DURING LOW TEMPERATURE

CROSS REFERENCE TO THE RELATED APPLICATION

This application is a continuation application, under 35 U.S.C §111(a) of international application No. PCT/JP2013/079195, filed Oct. 29, 2013, which claims priority to Japanese patent application No. 2012-246140, filed Nov. 8, 2012, the entire disclosure of which is herein incorporated by reference as a part of this application.

BACKGROUND OF THE INVENTION

1. Field of the Invention

The present invention relates to a low temperature drive control device for a motor mounted automotive vehicle for increasing the electric current value to be supplied to a wheel drive motor in the event that, in an automotive vehicle such as, for example, an electrically powered automotive vehicle or a hybrid car (gas-and-electric powered automobile), the outdoor air temperature is extremely low.

2. Description of Related Art

Suggestion has been made (in the patent document 1 listed below) of an electrically powered automotive vehicle in which rotation of a motor is transmitted to a wheel through a gear and a cooling oil for the motor and a lubricant oil for the gear are commonly used. In this known electrically powered automotive vehicle, for example, at the time the outdoor air temperature is below zero, an electric power is supplied across a coil of the motor to warm up the oils to thereby improve the engine startability such as discussed in the patent documents 1 and 2 below.

PRIOR ART LITERATURE

Patent Document 1: JP Laid-open Patent Publication No. 2011-089625
Patent Document 2: Japanese Patent No. 3918631

In the event of the outdoor air temperature being extremely low, the motor cooling oil and the gear lubricating oil have respective viscosities that are so high as to increase the rotational resistance of the motor. In such case, the torque outputted in dependence on the pedaling amount of an accelerator is rendered to be smaller than that during normal temperatures and, therefore, a driver of the automotive vehicle may feel discomfort.

In the case of warming up the oil by supplying the electric current to the coil before the engine being started, the engine is started before the oil may be warmed up and, therefore, it may often occur that the driver feels discomfort.

SUMMARY OF THE INVENTION

In view of the foregoing, the present invention has for its essential object to provide a low temperature drive control device for a motor mounted automotive vehicle in which the torque outputted actually in dependence on the acceleration input is rendered to be one that will not result in discomfort as compared with the torque during the normal temperatures and allow the automotive vehicle to be quickly start moving.

The low temperature drive control device for a motor mounted automotive vehicle is described, which is designed in accordance with the present invention, with the aid of reference numerals shown in the accompanying drawings in connection with a preferred embodiment thereof. The low temperature drive control device in accordance with the present invention is used for a motor mounted automotive vehicle of a type in which rotation of a motor 9 is transmitted to a wheel 1 through gears 13, 14, 17 and an oil for use in cooling the motor 9 and an oil for use in lubricating the gears 13, 14, 17 are commonly used.

The low temperature drive control device includes: a command torque calculator 24 to calculate a command torque to be supplied to the motor 9 in dependence on an acceleration input inputted from an acceleration input unit 27; a motor drive controller 23 to control an electric current value to be supplied to the motor 9 in dependence on the command torque calculated by the command torque calculator 24; an oil temperature detector 21 to detect the temperature of the oil; and a motor torque changer 25 to change the command torque in dependence on an oil temperature detected by the oil temperature detector 21.

The wording "oils commonly used" referred to above and hereinafter is to be understood as meaning that oils of the same brand having the same viscosity and having required additives and others added thereto are commonly used for cooling the motor 9 and for lubricating the gears 13, 14, 17.

When the electric power source in the motor mounted automotive vehicle is turned on and the motor mounted automotive vehicle is started moving, the command torque calculator 24 calculates a command torque to be supplied to the motor 9 in dependence on the acceleration input inputted from the acceleration input unit 27. The motor drive controller 23 then controls the current value to be supplied to the motor 9 in dependence on the command torque so calculated. In the event that the outdoor air temperature is extremely low, the viscosity of each of the oils for cooling the motor 9 and for lubricating the gears 13, 14, 17 is high, and therefore, the rotational resistance of the motor 9 increases.

Accordingly, the oil temperature detector 21 estimates an oil temperature, for example, directly or from the temperature of a stator of the motor 9 or a motor housing Hs. Then, the motor torque changer 25 changes the command torque to be supplied to the motor drive controller 23 in dependence on the oil temperature detected by the oil temperature detector 21, and the motor drive controller 23 controls so as to supply the electric current to the motor 9 in dependence on the command torque. By way of example, in the event of the oil temperature being extremely low, a motor conducting current corresponding to the command torque determined by means of the acceleration input is increased to a value larger than a current value during the normal temperature. By so doing, the relationship between the accelerator pedaling amount and the torque actually outputted can be made similar to that during the normal temperature. Accordingly, at the low temperature, the torque actually outputted in dependence on the acceleration input becomes one that will not render the driver to feel discomfort as compared with the torque during the normal temperature and, at the same time, the vehicle can be started moving more quickly than the conventional motor mounted automotive vehicle. It is to be noted that the normal temperature referred to above means 20° C.

The motor torque changer 25 referred to above may be so designed as to multiply the command torque, calculated by the command torque calculator 24, by a coefficient which varies with the oil temperature detected by the oil temperature detector 21.

The motor torque changer 25 referred to above may be so designed as to add an offset value, which varies with the oil temperature detected by the oil temperature detector 21, to the command torque calculated by the command torque calculator 24.

With the provision of a plurality of maps each descriptive of the relationship between the acceleration input and the command torque, the motor torque changer 25 referred to above may select the map, determined by the oil temperature detected by the oil temperature detector 21, and change the command torque in dependence on the preset content of the map so selected, so as to change the electric current value to be supplied to the motor drive controller 23.

By way of example, the relationship between the accelerator pedaling amount and the motor torque to be outputted is determined by means of experiments and/or simulations at the extremely low temperature, and comparison is made to a relationship between the accelerator pedaling amount and the motor torque to be outputted at the normal temperature. By so doing, the coefficient referred to above, the offset value referred to above and the previously described map can be determined.

The motor torque changer 25 referred to above may be so designed that in the event that the oil temperature detected by the oil temperature detector 21 is lower than a predetermined temperature, the electric current larger than the maximum electric current during the normal temperature may be supplied to the motor 9. The term "predetermined temperature" referred to above means, for example, −20° C. In the event that the oil temperature is extremely low, even though the electric current larger than the current supplied during the normal temperature is supplied to the motor 9, it is difficult to exceed the permissible current of the winding of the motor 9. For this reason, in the event of the oil temperature being low, the electric current larger than the maximum electric current during the normal temperature is supplied to the motor 9 and the maximum torque equivalent to that during the normal temperature can be outputted.

The oil temperature detector 21 referred to above may include a temperature sensor 19 to detect the temperature of the stator of the motor 9 or the temperature of the motor housing Hs, and an oil temperature estimator 20 to estimate the temperature of the previously mentioned oil on the basis of the temperature detected by the temperature sensor 19.

The low temperature drive control device of the present invention may include an integrated control ECU 6 configured to carry out an integrated control of the motor mounted automotive vehicle as a whole, and the integrated control ECU 6 may be provided with the motor torque changer 25 referred to above.

The low temperature drive control device of the present invention may include: an inverter device 7 including an inverter 22, which is connected with the motor 9; the motor drive controller 23 to control the inverter 22; and a motor current changer 25 provided in this inverter device 7 and configured to change the electric current to be supplied to the motor in dependence on the oil temperature detected by the oil temperature detector 21.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
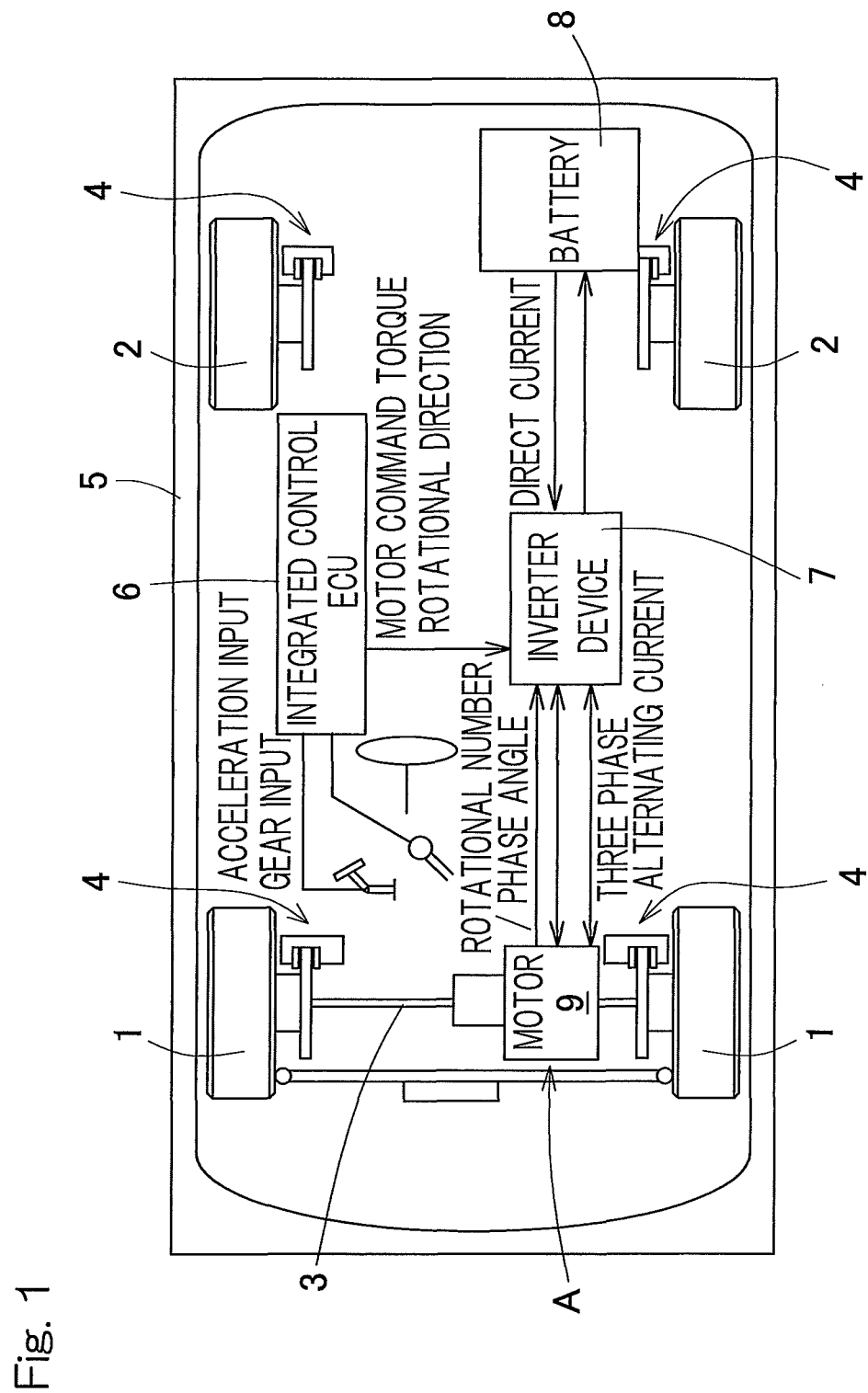
FIG. 1 is an explanatory diagram showing a conceptual structure of a low temperature drive control device for a motor mounted automotive vehicle designed in accordance with a first preferred embodiment of the present invention.

Preferred embodiments of the present invention will now be described in detail with reference to the accompanying drawings. In particular, FIG. 1 illustrates a conceptual diagram showing a motor mounted automotive vehicle equipped with a low temperature drive control device designed in accordance with a first preferred embodiment of the present invention. It is to be noted that the description made hereinafter is to be understood as including that of a low temperature drive controlling method. The illustrated motor mounted automobile is an electrically powered automotive vehicle of a type in which a pair of left and right front wheels 1 are drive wheels adapted to be driven by a vehicle motor drive device A and a pair of left and right rear wheels 2 are driven wheels. By the vehicle motor drive device A, with the rotation of the motor 9 transmitted to an axle 3 through a gear, front wheels 1 are rotationally driven. Each of the wheels 1 and 2 is provided with a brake 4. Although not shown, for example, in a hybrid car, with the rear wheels rendered to be auxiliary drive wheels, the rotational drive can be accomplished by the vehicle motor drive device.

A vehicle body 5 has mounted thereon an integrated control electric controller (integrated control ECU) 6, an inverter device 7, the vehicle motor drive device A and a battery 8. The integrated control ECU 6 performs an integrated control and a coordinate control of the automotive vehicle as a whole, and is a host controller for applying a command to the inverter device 7. The integrated control ECU 6 and the inverter device 7 are connected with each other through, for example, a control area network (abbr.: CAN). This integrated control ECU 6 includes a microcomputer, a control program installed on the microcomputer, electronic circuits and others.

The vehicle motor drive device A will first be described in detail.

Figure 2:
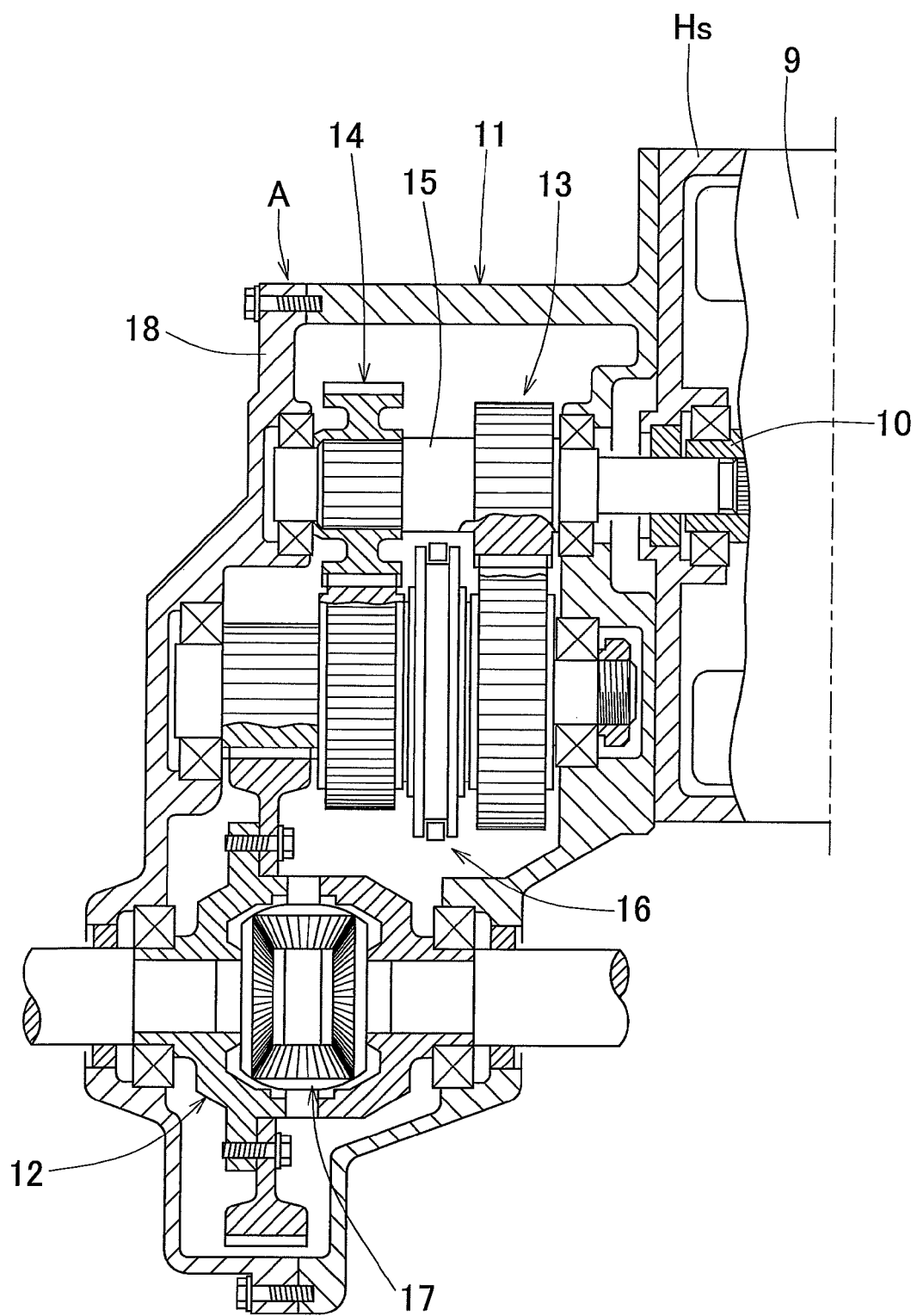
FIG. 2 is a sectional view of a vehicle motor drive device for the motor mounted automotive vehicle.

As shown in FIG. 2, the vehicle motor drive device A includes a motor 9 for traveling drive purpose, a transmission 11 for changing the velocity of rotation of an output shaft 10 of the motor 9 and then outputting the velocity changed rotation, and a differential gear 12 for distributing the rotation, outputted by the transmission 11, to the pair of the left and right wheels 1 (best shown in FIG. 1).

The transmission 11 in turn includes a train of gears 13 and 14 of a plurality of gear shift stages having different change gear ratios, two way roller clutch (not shown) interposed between an input shaft 15, connected with a motor shaft 10 which is an output shaft of the motor 9, and each of the gear trains 13 and 14 for the respective gear shift stages to accomplish a discontinuous speed change, and a change gear ratio selecting mechanism 16 for performing the discontinuous speed change of each roller clutch.

Each of the gear trains 13 and 14 for the respective gear shift stages, a gear train 17 forming the differential gear 12, and the roller clutches (which are collectively referred to as "gear train assembly") are all accommodated within a common casing 18 and are lubricated by a common oil bath within the casing 18. Also, the casing 18 and a motor housing Hs for the motor 9 are fixed and integrated together. The motor housing Hs has an outer peripheral surface provided with, for example, an annular groove of a recessed sectional shape and a covering member for covering such annular groove, and an oil for cooling the motor 9 is reserved in the annular groove. This oil for cooling the motor 9 and an oil for lubricating the gear train assembly are commonly utilized. In other words, the oil of the same brand and having the same viscosity and also having the same required additives added thereto is utilized simultaneously for the cooling of the motor 9 and the lubrication of the gear train assembly.

Figure 3:
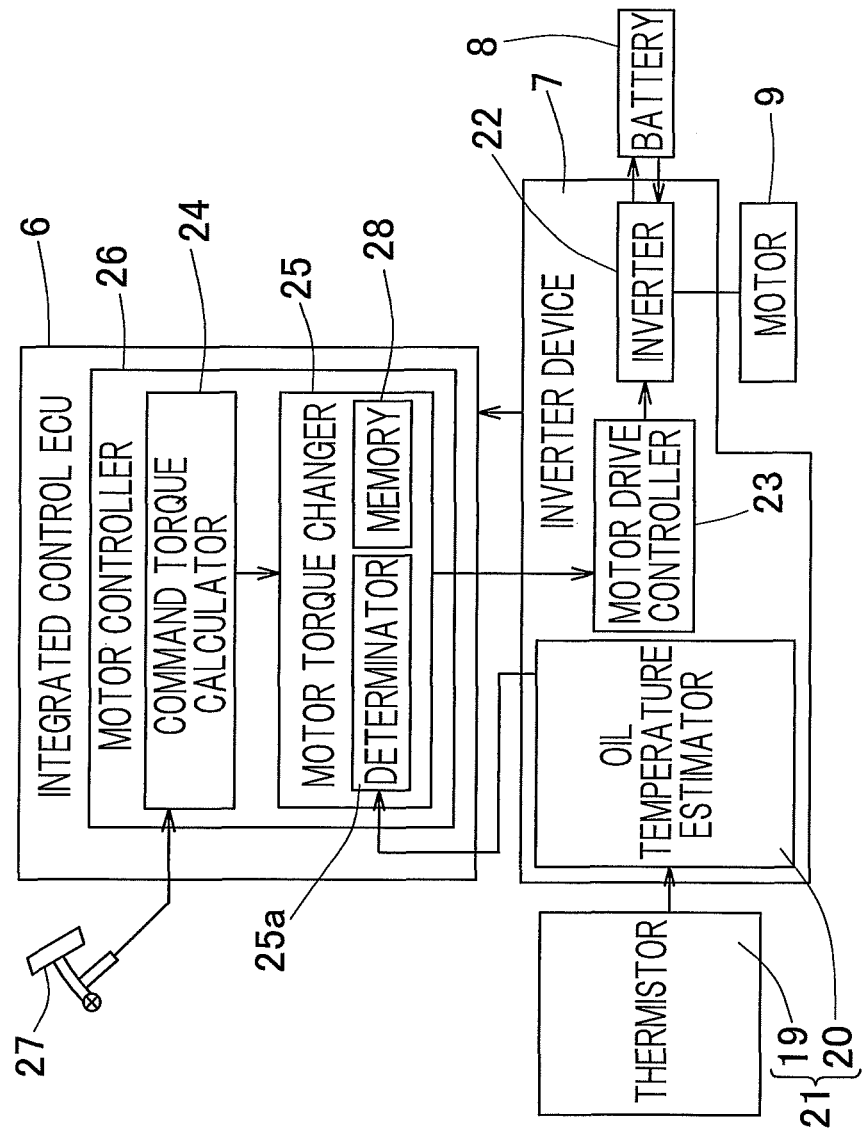
FIG. 3 is a block diagram showing the low temperature drive control device for the motor mounted automotive vehicle, in which the structure thereof is shown in detail, but the remaining portion thereof is shown simplified.

A temperature sensor, for example, a thermistor 19 best shown in FIG. 3, is fitted to a stator of the motor 9 or the motor housing Hs for detecting the temperature of either one of them. In the illustrated preferred embodiment, from a detection value detected by the thermistor 19, the temperature of the oil is indirectly estimated by an oil temperature estimator 20 including a predetermined relational formula. This relational formula is set up on the basis of, for example, experiments and/or simulations. The low temperature drive control device for the motor mounted automotive vehicle of the preferred embodiment includes an oil temperature detector 21 which includes an oil temperature detector 21 which includes the thermistor 19 and the oil temperature estimator 20. It is to be noted that a temperature sensor for directly detecting the oil temperature may be provided in, for example, an oil reservoir (not shown) in the vehicle motor drive device A.

A control system will be hereinafter described in detail.

As shown in FIG. 3, the inverter device 7 includes an inverter 22 and a motor drive controller 23 for controlling the inverter 22. The inverter 22 is comprised of a plurality of power elements each in the form of a switching element and is operable to convert a direct current of the battery 8 into a three phase alternating current. The motor drive controller 23 controls the electric current value to be supplied to the motor 9 in dependence on a command torque calculated by a command torque calculator 24 as will be described later. In this motor drive controller 23, the command torque is converted into an electric current command which is in turn applied to a PWM driver (not shown). This PWM driver performs a pulse width modulation on the electric current command, which has been inputted thereto, and then applies an ON/OFF command to each of the switching elements. The inverter device 7 also includes the oil temperature estimator 20 referred to previously.

The integrated control ECU 6 includes a motor controller 26 including the command torque calculator 24 and a motor torque changer 25. The low temperature drive control device of the motor mounted automotive vehicle includes the command torque calculator 24, the motor drive controller 23, the oil temperature detector 21 and the motor torque changer 25.

The command torque calculator 24 calculates the command torque to be supplied to the motor 9 in dependence on the acceleration input inputted from an accelerator pedal (acceleration input unit) 27, that is, an acceleration command. It is to be noted that although in the preferred embodiment as shown and described, the command torque has been described as calculated from the acceleration input, the present invention is not necessarily limited thereto. By way of example, from an acceleration command, which is outputted by the accelerator pedal 27, and a deceleration command which is outputted by a brake operating unit (not shown), an acceleration/deceleration command to be applied to the motor 9 may be calculated as the command torque.

The motor torque changer 25 is operable to change the command torque in dependence on the oil temperature estimated by the oil temperature estimator 20 of the oil temperature detector 21, and then, an electric current equivalent to the command torque so changed is supplied to the motor 9 by the motor drive controller 23. More specifically, the motor torque changer 25 includes a determinator 25a for determining whether or not the oil temperature estimated by the oil temperature estimator 20 and fed through the CAN is higher or lower than a predetermined temperature. The motor torque changer 25 is also operable to change the command torque only in the event that the oil temperature is determined by the determinator 25a as being lower than the predetermined temperature, and then, the electric current equivalent to the command torque so changed is supplied to the motor 9 by the motor drive controller 23. The predetermined temperature referred to above is rendered to be a temperature which is lower than, for example, 0° C. (zero degree centigrade). As hereinabove described, in the event that the outdoor air temperature is extremely low, the respective viscosities of the oils for motor cooling and gear lubrication become high and, therefore, the rotational resistance of the motor 9 increases.

Figure 4:
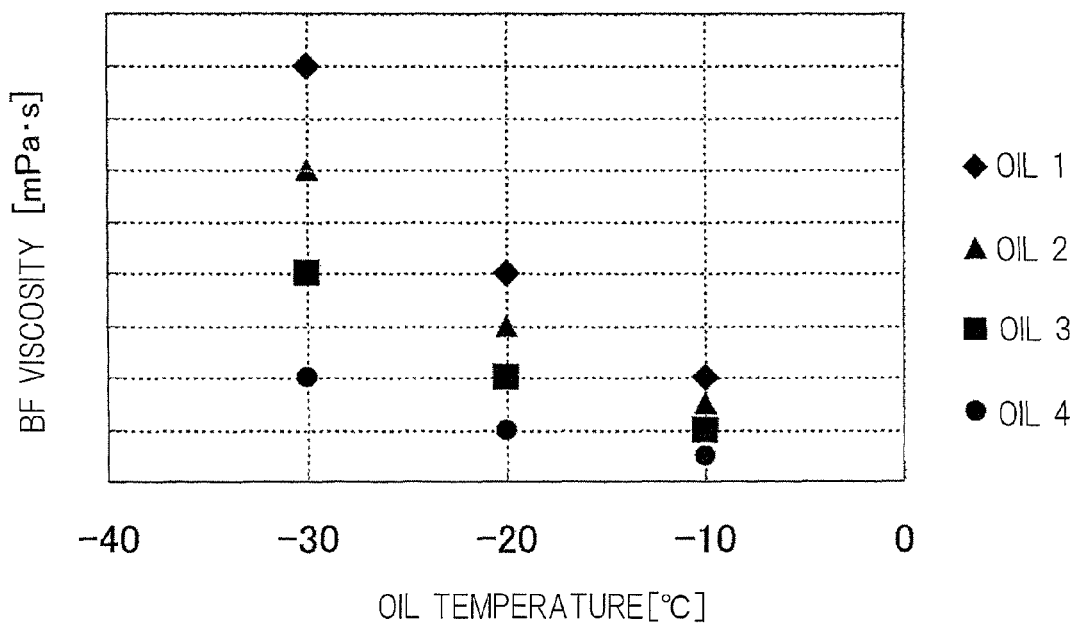
FIG. 4 is a chart descriptive of the relationship between the temperature and the viscosity, of various oils.

FIG. 4 illustrates a chart descriptive of the relationship between the temperatures of various oils and their viscosities.

As shown in FIG. 4, when the relationship between the oil temperature and the viscosity has been examined in connection with four kinds of oil indicated respectively by (1) to (4), all for use in motor cooling and gear lubrication, the tendency has been found in all of those oils (1) to (4) that the viscosity has increased with decrease of the oil temperature.

Figure 5:
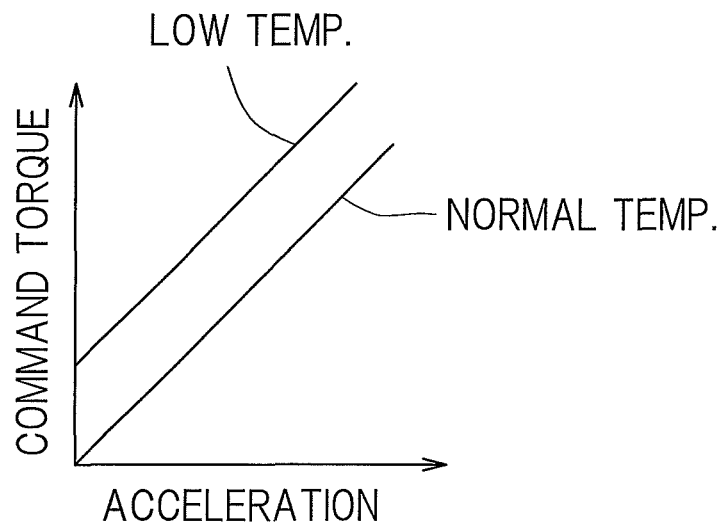
FIG. 5 is a chart descriptive of the relationships between an acceleration input and a command torque when at the normal temperature and when at a low temperature, respectively.
Figure 6:
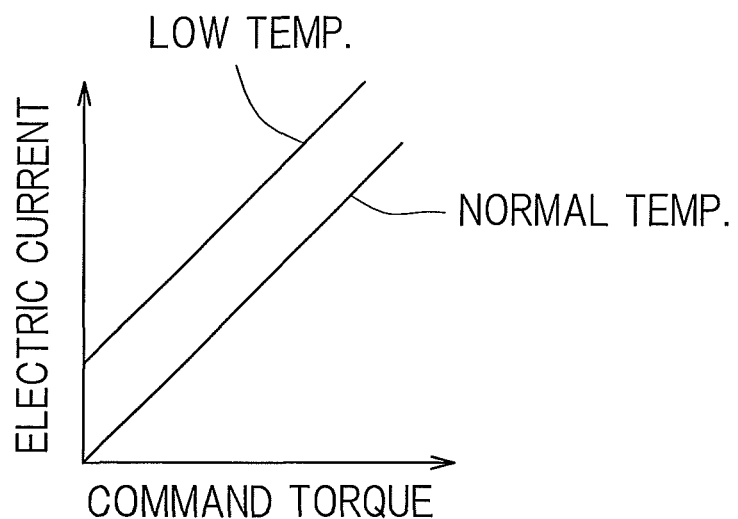
FIG. 6 is a chart descriptive of the respective relationships between the command torque and an electric current value to be supplied to a motor, when at the normal temperature and when at the low temperature.

FIG. 5 illustrates a chart descriptive of the relationship between the acceleration input and the command torque exhibited when at normal temperatures and at a low temperature. The following description is made with the aid of FIG. 3 taken together with FIG. 5. The motor torque changer 25 increases the electric current value to be supplied to the motor 9 so that the command torque relative to the acceleration input when at the low temperature may increase to a value higher than the command torque relative to the acceleration input when at the normal temperature. FIG. 6 illustrates a chart descriptive of the relationship between the command torque and the electric current value to be supplied to the motor. Specifically, so that the torque-electric current line when at the low temperature may exhibit an increase in a direction of the axis of ordinates of FIG. 6 to a value higher than the torque-electric current line when at the normal temperature, the electric current value to be supplied to the motor 9 is increased. More specifically, as shown in FIGS. 7A to 9B, the electric current value to be supplied to the motor when at the low temperature is increased.

Figure 7A:
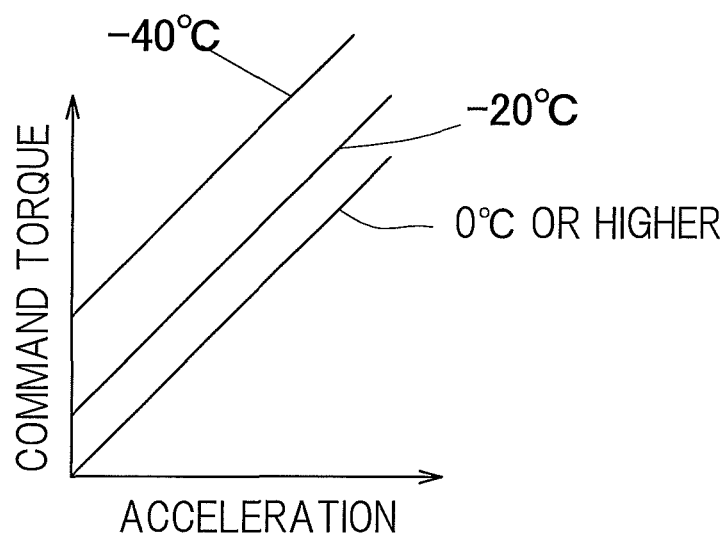
FIG. 7A is a chart descriptive of the relationship between the acceleration input and the command torque when an offset value variable with the oil temperature is set.
Figure 7B:
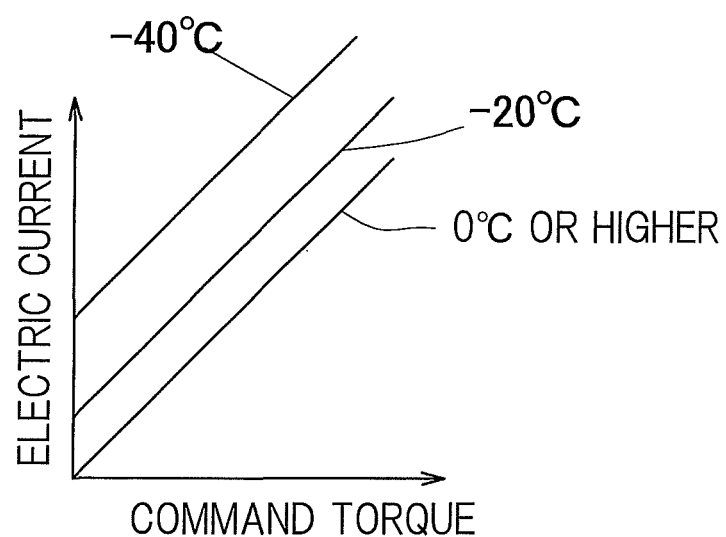
FIG. 7B is a chart descriptive of the relationship between the command torque and the electric current value to be supplied to the motor when the offset value variable with the oil temperature is set.

FIG. 7A illustrates a chart descriptive of the relationship between the acceleration input and the command torque when the offset value variable with the oil temperature is set up and FIG. 7B illustrates a chart descriptive of the relationship between the command torque and the electric current value to be supplied to the motor 9 when the offset value referred to above is set up. For, example, the motor torque changer 25 adds the offset value, which is variable in dependence on the oil temperature detected by the oil temperature detector 21, to the command torque calculated by the command torque calculator 24. The offset value is rewritably recorded in a memory 28 in the motor torque changer 25. When such offset value is set up as described above, as shown in FIG. 7A, for a given acceleration input, the lower the oil temperature, the higher the command torque.

The following table 1 illustrates one example of the offset values which are variable with the oil temperature.

TABLE 1

(Example of Offset Values)

| | Oil Temp. | | | | |
|---|---|---|---|---|---|
| | −40° C. | −20° C. | 0° C. | 20° C. | . . . |
| Offset Value | 10 Nm | 5 Nm | 0 Nm | 0 Nm | 0 Nm |

Figure 8A:
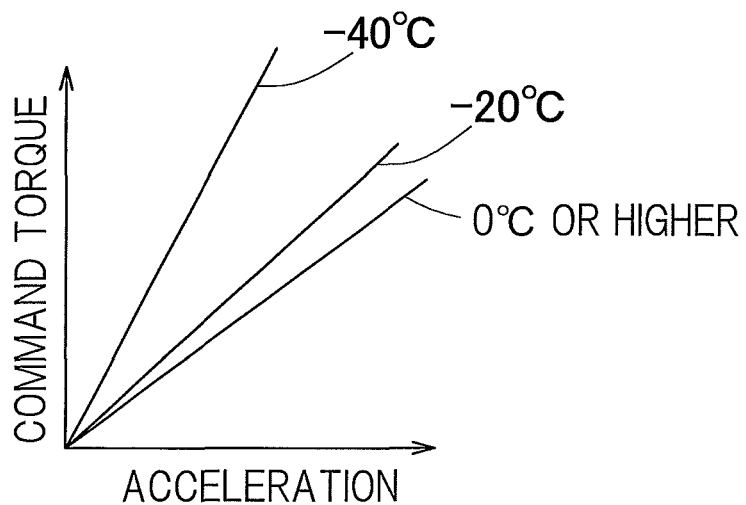
FIG. 8A is a chart descriptive of the relationship between the acceleration input and the command torque when a coefficient variable with the oil temperature is set.
Figure 8B:
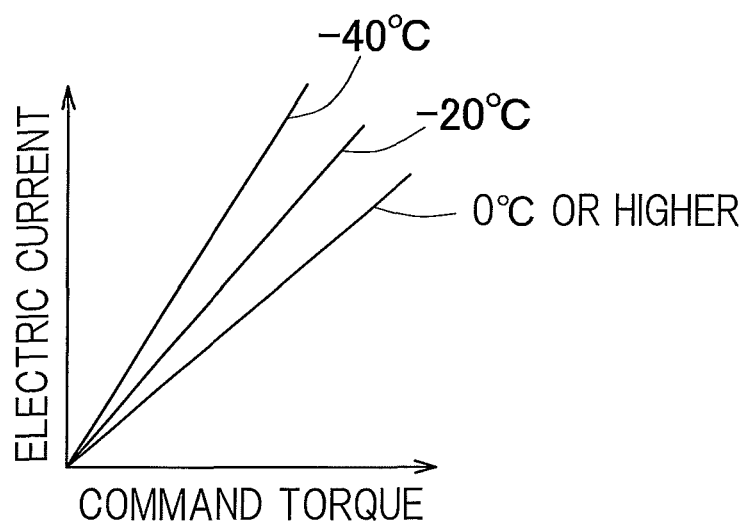
FIG. 8B is a chart descriptive of the relationship between the command torque and the electric current value to be supplied to the motor when the coefficient variable with the oil temperature is set.

FIG. 8A illustrates a chart descriptive of the relationship between the acceleration input and the command torque when the coefficient variable with the oil temperature is set up. FIG. 8B illustrates a chart descriptive of the relationship between the command torque and the electric current value to be supplied to the motor when such coefficient variable with the oil temperature is set up. For, example, the motor torque changer 25 multiplies the command torque, which has been calculated by the command torque calculator 24, by the coefficient which is variable in dependence on the oil temperature detected by the oil temperature detector 21. For example, the coefficient referred to above is rewritably recorded in the memory 28. When such coefficient is set up as described above, as the oil temperature becomes low, the gradient of the line representative of the command torque relative to the acceleration input becomes large as shown in FIG. 8A and the gradient of the line representative of the electric current value of the motor 9 relative to the command torque also becomes large as shown in FIG. 8B.

The following table 2 illustrates one example of the coefficients which are variable with the oil temperature.

TABLE 2

(Example of Coefficients)

| | Oil Temp. | | | | |
|---|---|---|---|---|---|
| | −40° C. | −20° C. | 0° C. | 20° C. | . . . |
| Coefficient | 1.3 | 1.1 | 1 | 1 | 1 |

Figure 9A:
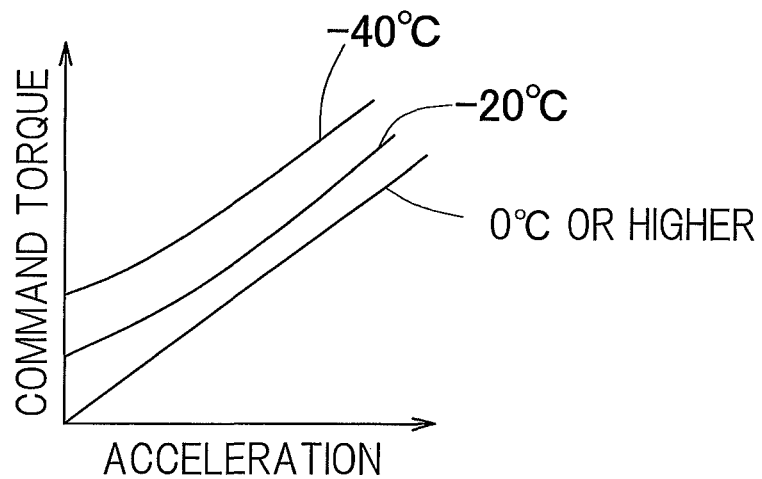
FIG. 9A is a chart descriptive of the relationship between the acceleration input and the command torque when a map is set for each of the oil temperature.
Figure 9B:
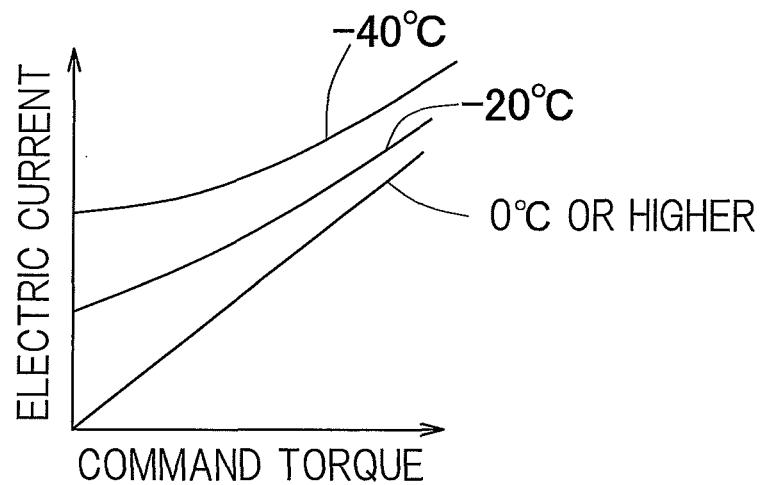
FIG. 9B is a chart descriptive of the relationship between the command torque and the electric current value to be supplied to the motor when the map is set for each of the oil temperature.

FIG. 9A is a chart descriptive of the relationship between the acceleration input and the command torque when the map is set up for each oil temperature. FIG. 9B is a chart descriptive of the relationship between the command torque and the electric current value to be supplied to the motor 9 when such map is set up. For, example, the motor torque changer 25 selects the map that is determined on the basis of the oil temperature detected by the oil temperature detector 21. The map referred to above is data descriptive of the relationship between the acceleration and the command torque and is, for example, rewritably recorded in the memory 28. When the map is set up in the manner described above, as shown in FIG. 9A, as the oil temperature become low, the command torque increases and, as shown in FIG. 9B, for a given command torque, as the oil temperature becomes low, the electric current value of the motor 9 increases.

Hereinafter, functions and effects will be described.

When the motor mounted automotive vehicle is started with the electric power source for the motor mounted automotive vehicle having been turned on, the command torque calculator 24 calculates the command torque to the motor 9 in dependence on the acceleration input which is inputted from the acceleration input unit 27. The motor drive controller 23 controls the electric current value to be supplied to the motor 9 in dependence on the command torque so calculated. In the event that the outdoor air temperature is extremely low (for example, at a temperature lower than −30° C.), the respective viscosities of the oil for cooling the motor 9 and the oil for lubricating the gear train assembly become high, and therefore, the rotational resistance of the motor 9 increases.

Then, the temperature of the stator of the motor 9 or the motor housing Hs is detected at all times by the thermistor 19. From the detection value detected by the thermistor 19, the oil temperature is indirectly estimated by the oil temperature estimator 20. Also, the motor torque changer 25 changes the command torque according to the oil temperature, and then, the electric current equivalent to the command torque so changed is supplied to the motor 9 by the motor drive controller 23. By way of example, in the event of the oil temperature being extremely low, the motor conducting current corresponding to the command torque determined by means of the acceleration input is increased to a value larger than that when at the normal temperature. The motor conducting current referred to above is calculated from the command torque determined on the basis of at least one of the coefficient, the offset value and the map, all of which are variable with the oil temperature as described previously. Accordingly, the relationship between the accelerator pedaling amount and the torque which is actually outputted can be rendered to be similar to that when at the normal temperature. Accordingly, at the low temperature, the torque dependent on the acceleration input can be rendered to be one that will not result in discomfort as compared with the torque during the normal temperatures, and the automotive vehicle can be quickly started moving as compared with the conventional motor mounted automotive vehicle.

Other preferred embodiments of the present invention will be described hereinafter. It is, however, to be noted that in the description that follows, component parts similar to those shown and described in connection with the preceding embodiments of the present invention are shown by like reference numerals and, therefore, the details thereof are not reiterated for the sake of brevity. Where only a part of the construction is described, the remaining part of the construction is to be understood as similar to that in the preceding embodiment or embodiments. Similar functions and effects can be delivered from the similar construction. It is also to be noted that it is possible not only to combine components specifically described in connection with each of the foregoing and following embodiments of the present invention, but also to partially combine two or more of the foregoing and following embodiments of the present invention.

The motor torque changer 25 referred to above may be so designed as to supply the electric current value, which is larger than the maximum electric current at the normal temperature, to the motor 9 in the event that the oil temperature detected by the oil temperature detector 21 is lower than a predetermined temperature. The predetermined temperature referred to above is, for example, −20° C. Even when, in the event of the oil temperature being extremely low, the electric current larger than the electric current to be supplied at the normal temperature is supplied to the motor 9, it becomes difficult to exceed the permissible current of the winding of the motor 9. For this reason, in the event of the oil temperature being extremely low, when the electric current value larger than the maximum electric current during the normal temperature is supplied to the motor, the maximum torque equivalent to the normal temperature can be outputted. Accordingly, as is the case with the previously described first preferred embodiment of the present invention, at the low temperature, the torque actually outputted in dependence on the acceleration input can become one that will not render the driver to feel discomfort as compared with the torque during the normal temperature and, at the same time, the vehicle can be started moving more quickly than the conventional motor mounted automotive vehicle.

Figure 10:
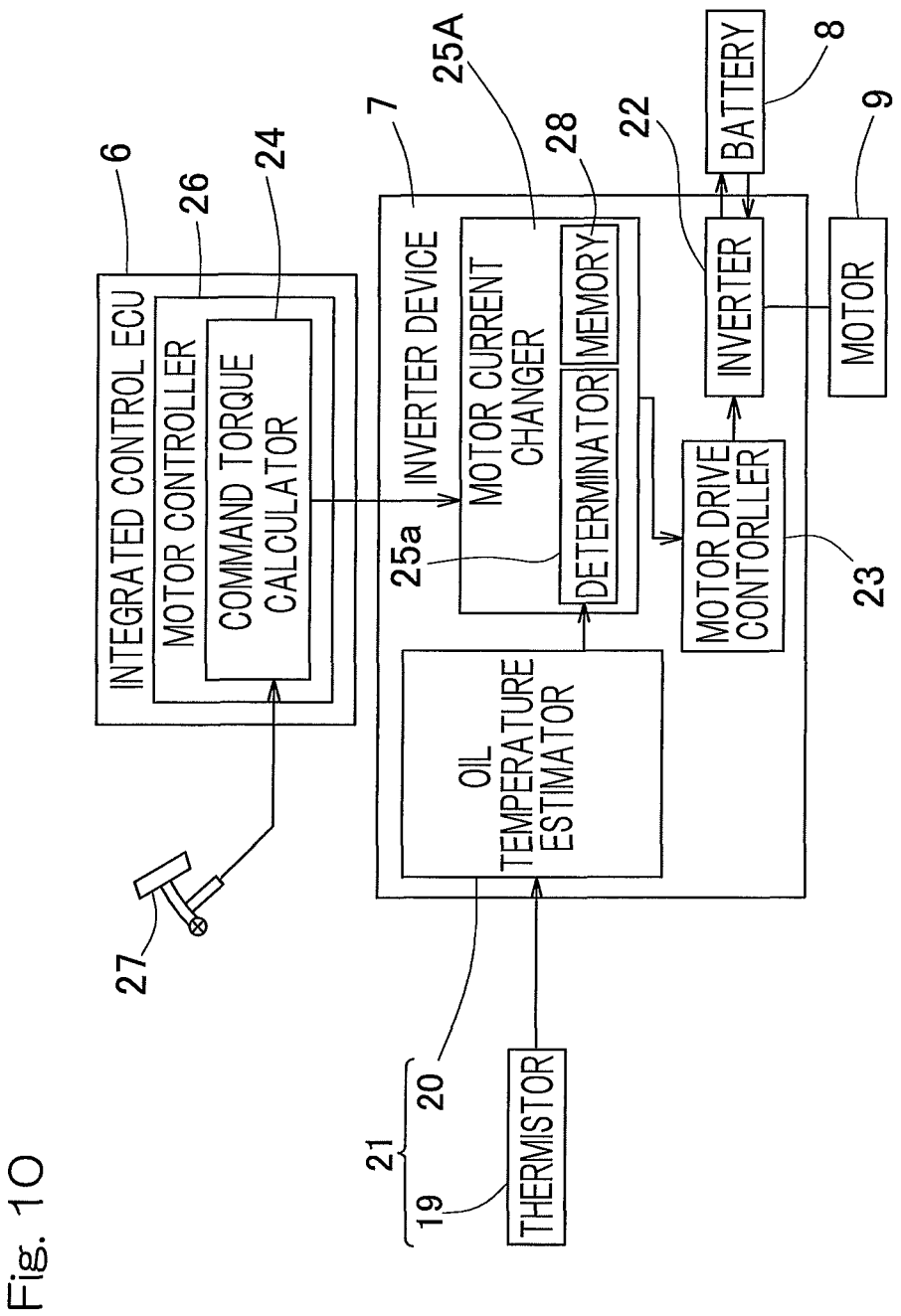
FIG. 10 is a block diagram showing a portion of the structure of the low temperature drive control device for the motor mounted automotive vehicle designed in accordance with a second preferred embodiment of the present invention.

In place of the motor torque changer 25, a motor current changer 25A may be provided in the inverter device 7 as shown in a second preferred embodiment of FIG. 10. In the second preferred embodiment, the electric current value determined by the command torque fed from the integrated control ECU 6 is changed according to the oil temperature. The oil temperature estimator 20 may be provided at any location other than the inverter device.

In the construction shown in FIG. 3 or FIG. 10, one or both of the determinator 25a and the memory 28 may be provided separate from the motor torque changer 25 and the motor current changer 25A.

Figure 11:
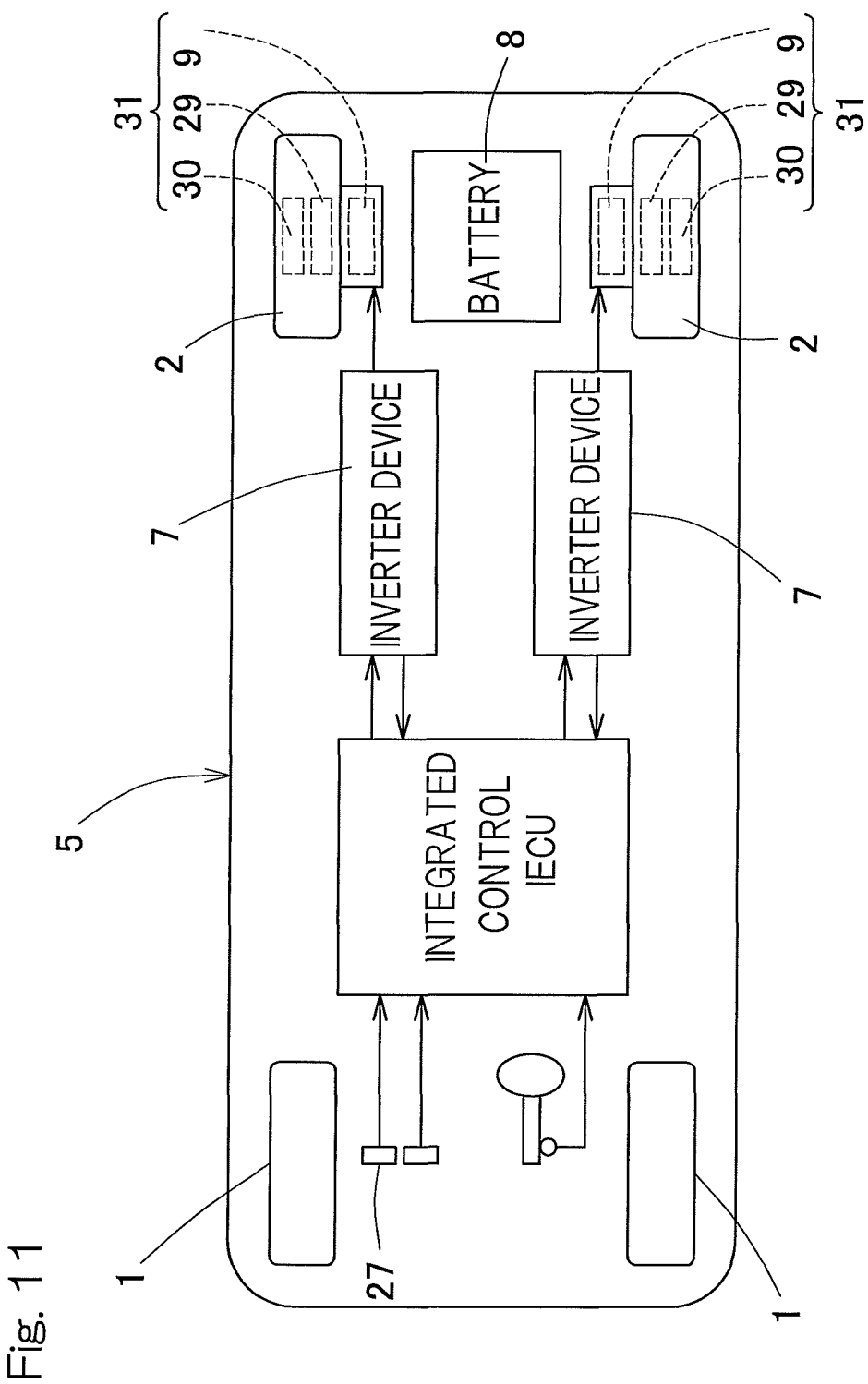
FIG. 11 is a block diagram showing a conceptual structure of the low temperature drive control device for the motor mounted automotive vehicle designed in accordance with a third preferred embodiment of the present invention.

As shown in a third preferred embodiment of FIG. 11, either of the low temperature drive control devices according to the first and second preferred embodiments may be mounted on the electrically powered automotive vehicle of a type in which the left and right wheels 2 and 2, which will become the driving wheels, are driven by independent traveling motors 9 and 9. The rotation of the motor 9 is transmitted to the wheel 2 through a speed reducer 29 and a wheel support bearing assembly 30. The motor 9, the speed reducer 29 and the wheel support bearing assembly 30 form an in-wheel motor drive device 31 which is a single assembled component of them. Even in the third preferred embodiment shown in FIG. 11, the motor torque changer 25 changes the command torque in dependence on the oil temperature, and the electric current value to be supplied to the motor 9 is changed by the motor drive controller 23. Accordingly, at the low temperature, the torque in dependence on the acceleration input can become one that will not render the driver to feel discomfort as compared with the torque during the normal temperature and, at the same time, the vehicle can be started moving more quickly than the conventional motor mounted automotive vehicle.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Wheel
6 . . . Integrated control ECU
7 . . . Inverter device
9 . . . Motor
20 . . . Oil temperature estimator
21 . . . Oil temperature detector
22 . . . Inverter
23 . . . Motor drive controller
24 . . . Command torque calculator
25 . . . Motor torque changer
25A . . . Motor current changer
27 . . . Acceleration input unit

What is claimed is:

1. A low temperature drive control device for a motor mounted automotive vehicle, in which rotation of a motor is transmitted to a wheel through a gear and an oil for use in cooling the motor and an oil for use in lubricating the gear are commonly used, the drive control device comprising:
a command torque calculator to calculate a command torque to be supplied to the motor in dependence on an acceleration input inputted from an acceleration input unit;
a motor drive controller to control an electric current value to be supplied to the motor in dependence on the command torque calculated by the command torque calculator;
an oil temperature detector to detect the temperature of the oil; and
a motor torque changer to change the command torque in dependence on an oil temperature detected by the oil temperature detector,
wherein the motor torque changer is operable to multiply the command torque, calculated by the command torque calculator, by a coefficient which varies with the oil temperature detected by the oil temperature detector.

2. The low temperature drive control device for the motor mounted automotive vehicle as claimed in claim 1, wherein the motor torque changer is operable that in the event that the oil temperature detected by the oil temperature detector is lower than a predetermined temperature, the electric current larger than the maximum electric current during the normal temperature is supplied to the motor.

3. The low temperature drive control device for the motor mounted automotive vehicle as claimed in claim 1, wherein the oil temperature detector comprises:
- a temperature sensor to detect the temperature of a stator of the motor or the temperature of a motor housing; and
- an oil temperature estimator to estimate the temperature of the oil on the basis of the temperature detected by the temperature sensor.

4. The low temperature drive control device for the motor mounted automotive vehicle as claimed in claim 1, further comprising:
- an inverter device including an inverter, connected with the motor, and the motor drive control device to control the inverter; and
- a motor current changer provided in the inverter device and configured to change the electric current to be supplied to the motor in dependence on the oil temperature detected by the oil temperature detector.

5. A low temperature drive control device for a motor mounted automotive vehicle, in which rotation of a motor is transmitted to a wheel through a gear and an oil for use in cooling the motor and an oil for use in lubricating the gear are commonly used, the drive control device comprising:
- a command torque calculator to calculate a command torque to be supplied to the motor in dependence on an acceleration input inputted from an acceleration input unit;
- a motor drive controller to control an electric current value to be supplied to the motor in dependence on the command torque calculated by the command torque calculator;
- an oil temperature detector to detect the temperature of the oil; and
- a motor torque changer to change the command torque in dependence on an oil temperature detected by the oil temperature detector,
- wherein the motor torque changer is operable to add an offset value, which varies with the oil temperature detected by the oil temperature detector, to the command torque calculated by the command torque calculator.

6. A low temperature drive control device for a motor mounted automotive vehicle, in which rotation of a motor is transmitted to a wheel through a gear and an oil for use in cooling the motor and an oil for use in lubricating the gear are commonly used, the drive control device comprising:
- a command torque calculator to calculate a command torque to be supplied to the motor in dependence on an acceleration input inputted from an acceleration input unit;
- a motor drive controller to control an electric current value to be supplied to the motor in dependence on the command torque calculated by the command torque calculator;
- an oil temperature detector to detect the temperature of the oil; and
- a motor torque changer to change the command torque in dependence on an oil temperature detected by the oil temperature detector,
- wherein a plurality of maps, each descriptive of the relationship between the acceleration input and the command torque, are provided, and the motor torque changer is operable to select the map, determined by the oil temperature detected by the oil temperature detector, and to change the command torque in dependence on the preset content of the map so selected, so as to change the electric current value to be supplied to the motor drive controller.

7. A low temperature drive control device for a motor mounted automotive vehicle, in which rotation of a motor is transmitted to a wheel through a gear and an oil for use in cooling the motor and an oil for use in lubricating the gear are commonly used, the drive control device comprising:
- a command torque calculator to calculate a command torque to be supplied to the motor in dependence on an acceleration input inputted from an acceleration input unit;
- a motor drive controller to control an electric current value to be supplied to the motor in dependence on the command torque calculated by the command torque calculator;
- an oil temperature detector to detect the temperature of the oil;
- a motor torque changer to change the command torque in dependence on an oil temperature detected by the oil temperature detector; and
- an integrated control ECU to carry out an integrated control of the motor mounted automotive vehicle as a whole, the integrated control ECU being provided with the motor torque changer.

* * * * *

UNITED STATES PATENT AND TRADEMARK OFFICE
CERTIFICATE OF CORRECTION

Page 1 of 1

PATENT NO. : 9,283,851 B2
APPLICATION NO. : 14/703194
DATED : March 15, 2016
INVENTOR(S) : Takeshi Kanda It is certified that error appears in the above-identified patent and that said Letters Patent is hereby corrected as shown below:

ON THE TITLE PAGE
Column 2 (Item (57) Abstract) Line 10:
Delete "calculator" and insert -- calculator, --, therefor.

Signed and Sealed this
Seventh Day of June, 2016

Michelle K. Lee
*Director of the United States Patent and Trademark Office*